Figure 1:
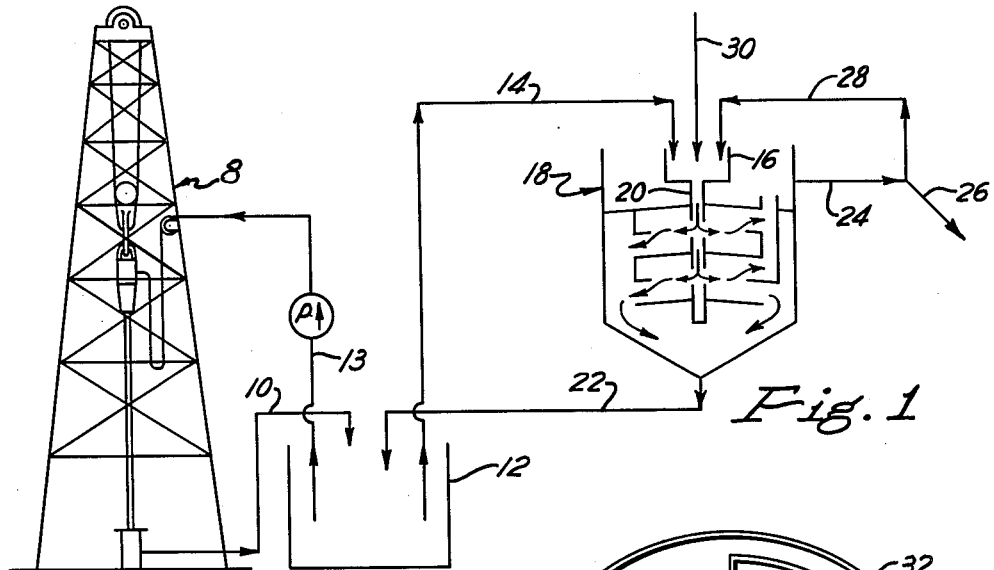

INVENTOR.
WALTER F. ROGERS
BY
*Hiram Hooker*
ATTORNEY

United States Patent Office 3,039,545
Patented June 19, 1962

3,039,545
PROCESS FOR THE TREATMENT OF DRILLING MUDS
Walter F. Rogers, Houston, Tex., assignor to Gulf Oil Corporation, Pittsburgh, Pa., a corporation of Pennsylvania
Filed Jan. 29, 1960, Ser. No. 5,429
7 Claims. (Cl. 175—66)

This invention relates to the treatment of drilling muds and more particularly to a method of treating drilling muds to recover weighting materials and soluble chemicals in the drilling mud and discard clay and cuttings from the drilling mud.

In the rotary drilling of wells, a drilling mud is circulated down through the drill pipe and up the annulus between the drill pipe and the borehole wall. The drilling mud serves a number of functions, among which are carrying cuttings from the hole and exerting sufficient hydrostatic pressure against the borehole wall to prevent the influx of fluids from the formations penetrated by the borehole. Frequently large amounts of chemicals are incorporated in the drilling mud to provide a mud having the desired characteristics. For example, when it is contemplated that the borehole will penetrate high pressure zones, concentrations as high as 30 to 35 percent by volume of weighting agents of high density, usually finely ground barite, are incorporated in the drilling mud to increase its density and thereby provide sufficient hydrostatic pressure to overcome the pressures existing in the formations. In addition to the weighting agents used to adjust their density, drilling muds contain substantial quantities of soluble, dispersed, or liquid ingredients such as starches, oil, carboxymethylcellulose, dispersants, etc. to control properties of the drilling mud other than its density.

To reduce the total amount of drilling mud required for a well, and hence the cost of the mud, the mud discharged at the top of the borehole is ordinarily passed through a shale shaker or other mechanism for separating large solid particles carried by the drilling mud and delivered to a mud pit from which the drilling mud is picked up by a pump and again circulated through the drill pipe to the bottom of the hole. During the drilling of many formations, fine sized particles of clays and shales become incorporated in the mud stream and greatly increase the gel strengths and viscosities of the drilling mud. The increase in viscosity is particularly serious in drilling muds containing high concentrations of weighting agents, even though the clay concentration may be low. Before recirculating the drilling mud to the mud pump, it is essential that fine particles of cuttings and clay picked up by the drilling mud as it is circulated in the hole be removed to maintain the desired characteristics of the drilling mud. Frequently a stream of drilling mud from the mud pit is passed through a centrifuge in which the drilling mud is separated into one stream consisting principally of the weighting material and a small amount of liquid components of the drilling mud and another stream of the lighter weight cuttings of clay and shale particles picked up in the drilling operation with the major portion of the liquid of the drilling mud. The weighting material is returned to the mud pit, and the clay and shales discarded from the system. Although the centrifuge is effective in making a separation between the weighting agent and the cuttings, about eighty percent of the liquid or soluble components of the drilling mud charged to the centrifuge remain with the cuttings and are discarded from the system. Another objection to the use of centrifuges is that they are costly pieces of equipment with a high daily rental charge.

This invention resides in a method of recovering the weighting material and a portion of the soluble chemicals from a drilling mud in which a drilling mud withdrawn from the mud pit is diluted with a fluid substantially free of weighting material and then passed through a gravity separator in which a stream of weighted mud is withdrawn and returned to the mud pit. A separate stream of mud and cuttings is withdrawn from the gravity separator and divided into two streams. One of these is recirculated through the gravity separator to reduce the effective concentration of weighting material and clay in the charge to the gravity separator and the other stream is discarded from the system.

Figure 2:
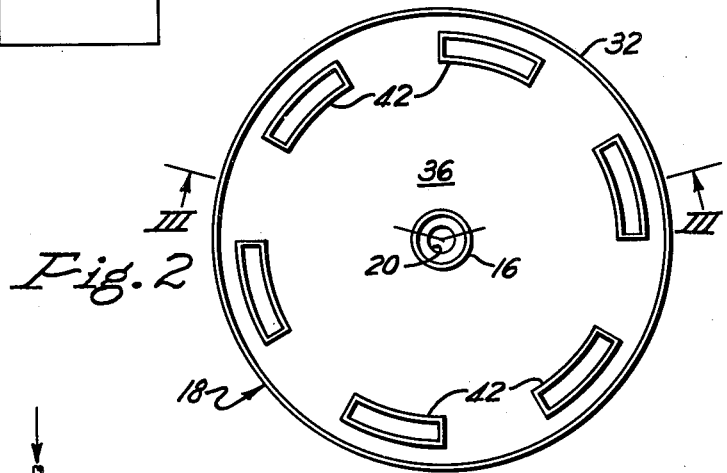
Figure 3:
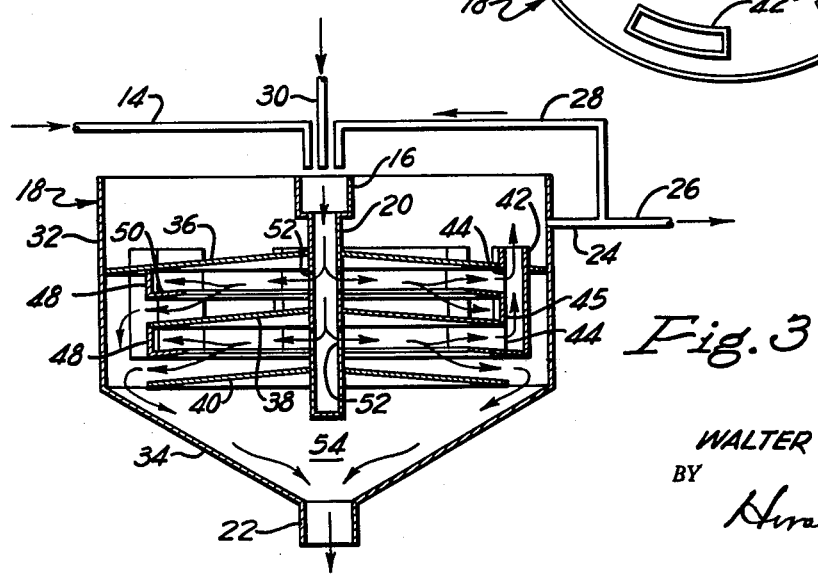

In the drawings:
FIGURE 1 is a diagram of the mud treating system of this invention in which pumps, valves, and other control equipment have been omitted to simplify the drawing.
FIGURE 2 is a plan view of a gravity separator suitable for use in this invention to separate the weighting material from the cuttings.
FIGURE 3 is a vertical sectional view along section line III—III in FIGURE 2 of the gravity separator illustrated in FIGURE 2.

Referring to FIGURE 1 of the drawings, drilling mud from a shale shaker or other screening apparatus, not shown, of a drilling rig indicated generally by reference numeral 8 is delivered through a line 10 into a mud pit 12. Drilling mud is withdrawn from the mud pit 12 through a line 13 and delivered to the drill pipe of the drilling rig for circulation down the hole. The mud pit 12 may be provided with conventional agitating equipment, such as mud guns, for maintaining solid constituents in suspension in the mud.

In the treatment of the drilling mud by the method of this invention, a stream of drilling mud is withdrawn from the mud pit 12 through a line 14 and delivered to the head box 16 of a gravity separator indicated generally by reference numeral 18. The drilling mud flows from the head box 16 through a standpipe 20 into the gravity separator 18 in which the heavy weighting material is separated from the lighter clay and cuttings. A stream of weighting material containing a portion of the liquid phase of the drilling mud is withdrawn from the bottom of the gravity separator 18 and delivered through a line 22 into the mud pit 12.

An overflow stream of cuttings suspended in a portion of the liquid phase of the drilling mud is withdrawn from the upper portion of the gravity separator 18 through a line 24. The stream of cuttings in line 24 is divided into two parts, one of which is discarded from the system through a line 26 and the other is recirculated to the head box 16 through a line 28. Additional water, approximately equivalent to the volume discarded by line 26, is added to the system through a line 30 discharging into the head box 16.

Referring to FIGURES 2 and 3 in which one embodiment of a gravity separator suitable for use in this invention is illustrated, the gravity separator 18 comprises a vertical cylindrical shell 32 having its lower end closed by a conical bottom member 34. The head box 16 and vertical standpipe 20 are supported within the shell 32. A series of vertically spaced conical trays 36, 38, and 40 slope outwardly from the standpipe 20 towards the side walls 32 of the gravity separator 18. The outer edge of upper tray 36 fits in a fluid-tight manner against the shell 32. A plurality of risers 42 extends upwardly through the trays 36 and 38 at intervals around the outer edge of the trays to form conduits through which cuttings suspended in the liquid phase of the drilling mud are carried upwardly out of contact with the weighting material separated from the catalyst in the gravity separator 18. In the preferred embodiment illustrated, the spaced apart risers 42 cover approximately half of the periphery of the trays 36 and 38.

Openings 44 in the inner walls 45 of the risers 42 allow flow of liquid from immediately beneath the trays 36 and 38 into the risers. Extending downwardly from trays 36 and 38 between the risers 42 part of the way to the next lower trays are end-plates 48. The end-plates 48 engage the under surface of the trays 36 and 38 to block the outward flow between the risers 42 of low density liquid immediately underneath those trays and prevent mixing of that liquid with the high density stream discharged from the outer edge of the next higher tray. Baffles 50 extend inwardly from the riser below the openings 44 and from the lower ends of end-plates 48 to reduce mixing of the overflow stream entering the risers with the high density liquid, having a high concentration of weighting material, immediately above the trays.

In the treatment of the drilling mud by this invention, the overflow stream of clay and cuttings delivered through line 28 into the head box 16 dilutes the drilling mud delivered into the head box 16 through line 14 to reduce the concentration of weighting agent and thereby reduces the viscosity of the mixture delivered into the gravity separator 18. Since a portion of the liquid phase of the drilling mud is discarded from the system through line 26, it is usually necessary to add make-up water to maintain the desired volume of drilling mud. Make-up water is added at the head box 16 and causes a further reduction in the viscosity of the drilling fluid discharged from the head box 16 through standpipe 20. That fluid is discharged through openings 52 in the standpipe 20 into the space between trays 36 and 38 and trays 38 and 40. In the space between the trays the weighting material settles from the quiescent diluted drilling mud to form a high density slurry containing a high concentration of weighting material immediately above the upper surface of trays 38 and 40. The high density slurry moves outwardly along the downwardly sloping trays 38 and 40 and drops from the outer edge of those trays between the risers 42 into a pool 54 at the bottom of separator 18. Weighting material tending to settle from the slurry in the pool slides down the conical walls to the bottom outlet of the separator. Movement of the settled slurry can be aided by vibration of the separator 18.

The cuttings, being lighter than the weighting material, are floated by the high density slurry along the upper surface of trays 38 and 40 and collect in the liquid immediately below the trays 36 and 38. Outward movement of the liquid containing the cuttings past the ends of the trays between the risers is prevented by the end-plates 48. The liquid carrying the cuttings then enters through the openings 44 into the risers 42 and is carried from the gravity separator 18 as an overflow stream through line 24.

The advantage of reducing the viscosity of the drilling mud to permit more effective separation of weighting materials and cuttings by this invention is illustrated by the following examples.

EXAMPLE 1

A drilling mud corresponding to the drilling mud withdrawn from the mud pit through line 14 was introduced into a gravity separator in which a stream containing weighting material and a portion of the liquid phase of the drilling mud was withdrawn. A separate overflow stream of a fluid consisting principally of the clay and cuttings supported in a portion of the liquid phase of the drilling mud was withdrawn from the gravity separator. The stream of discarded fluid was divided into two parts, one of which was admixed with the drilling mud to reduce its viscosity. Whereas the drilling mud has a plastic viscosity of 73 centipoises, the recirculated fluid admixed with the drilling mud to reduce the viscosity of the liquid in the gravity separator had a plastic viscosity of 12 centipoises.

EXAMPLE 2

A drilling mud is separated by gravity into a first stream comprising principally a weighting agent and liquid constituents of the mud and a second stream comprising principally cuttings and liquid constituents of the mud. The second stream was divided into two equal streams, one of which was discarded from the system, and the other was returned for re-mixing with the raw mud. Water equal to the quantity of water discarded from the system was mixed with the raw mud and the recycle stream. The characteristics of the different streams, which are identified by the reference numerals of the corresponding streams in FIGURE 1, were as follows:

*Table*

|  | Mud Wt., lb./gal. | Plastic Viscosity, Centipoise | Yield, lbs./100 sq. ft. | Gel Strengths, lbs./100 sq. ft. | |
| --- | --- | --- | --- | --- | --- |
|  |  |  |  | 0 | 10 min. |
| Raw mud, Line 14 | 15.6 | 34 | 18 | 0 | 90 |
| Discard mud, Line 24 | [1] 11.1 | 18 | 0 | 0 | 0 |
| 60% by vol. discard plus 40% by vol. water, Lines 28 and 30 | 9.8 | 5 | 1 | 0 | 0 |
| 50% raw mud plus 50% of discard plus water above. Same as fluid in standpipe 20 | 12.4 | 20 | 3 | 0 | 0 |
| Recovery, Line 22 | 13.85 | 23 | 1 | 0 | 5 |

[1] The discard volume to waste contained 27.2% of the fluid in the entering raw mud.

The recirculation of a portion of the stream of cuttings and drilling mud liquids separated in the gravity separator allows a substantial reduction of the viscosity of the liquid in the gravity separator below the viscosity of the drilling mud in the mud pit in addition to the reduction caused by the mixing with make-up water. With the process of this invention, the characteristics of the drilling mud delivered from the mud pit to the drilling rig can be maintained in the optimum ranges for drilling and the viscosity of the fluid in the gravity separator controlled independently for most effective separation of cuttings from the weighting material. The stream of weighting material delivered from the bottom of the gravity separator contains a substantially larger portion of the liquid constituents of the drilling mud than the stream of weighting material discharged from the conventional centrifuges used to separate weighting material from cuttings. The larger amount of liquid components such as starches, oil, carboxy methyl cellulose, dispersants, etc. returned to the mud pit with the weighting material reduces the amount of those materials discarded from the system and thereby reduces the total costs of the drilling mud. For example, a single stage centrifuge separating all the barites except the fines below about two microns in diameter will discard about 80 percent of the mud fluid from the system. A similar separation can be made with the gravity separator using the process of this invention and about 50 to 75 percent of the liquid components are returned to the mud pit with the weighting material.

I claim:

1. A method of treating drilling muds containing weighting materials delivered to a mud pit for reuse in the drilling of wells comprising withdrawing a stream of the drilling mud from the mud pit and delivering the drilling mud into a gravity separator, separating drilling mud delivered into the gravity separator into a high density stream containing a high concentration of weighting materials and an overflow stream containing clay and cuttings suspended in liquid of the drilling mud, returning the high density stream containing the high concentration of weighting materials to the mud pit, and recirculating a portion of the overflow stream into the stream of drilling mud withdrawn from the mud pit to dilute the drilling mud before delivering it into the gravity separator.

2. In a method of treating a drilling mud used in a process for the rotary drilling of wells in which the drilling mud is delivered from the well into a mud pit and recirculated from the mud pit into the well and a stream of the drilling mud is circulated from the mud pit through a gravity separator wherein the drilling mud delivered to the gravity separator is separated into a high density stream containing a high concentration of weighting materials suspended in drilling mud liquids and a low density stream containing clay and cuttings suspended in drilling mud liquids, the improvement comprising diluting the drilling mud delivered from the mud pit to the gravity separator before introduction into the gravity separator with a portion of the low density stream of clay and cuttings suspended in drilling mud liquids.

3. In a method of treating a drilling mud used in a process for the rotary drilling of wells in which the drilling mud is delivered from the well into a mud pit and recirculated from the mud pit into the well and a stream of the drilling mud is circulated from the mud pit through a gravity separator, the improvement comprising dividing the drilling mud in the gravity separator into a high density stream of drilling mud liquids containing a high concentration of weighting materials and a low density stream substantially free of weighting materials and containing clay and cuttings suspended in drilling mud liquid, and delivering a portion of said low density stream into the stream of drilling mud from the mud pit before introduction of the drilling mud into the gravity separator to reduce the viscosity of the fluid introduced into the gravity separator.

4. A method of treating drilling muds containing weighting materials delivered to a mud pit for reuse in the drilling of wells comprising withdrawing a stream of the drilling mud from the mud pit and delivering the drilling mud into a gravity separator, separating drilling mud delivered into the gravity separator into a high density stream of drilling mud liquids containing a high concentration of weighting materials and an overflow stream containing clay and cuttings suspended in liquid of the drilling mud, returning the high density stream containing the high concentration of weighting materials to the mud pit, dividing the overflow stream into a first stream and a second stream, discarding the first stream from the system and recirculating the second stream into the stream of drilling mud from the mud pit at a point prior to the introduction of the drilling mud into the gravity separator.

5. A process as set forth in claim 4 in which a stream of make-up liquids is mixed with the stream of drilling mud withdrawn from the mud pit prior to the introduction of the drilling mud into the gravity separator.

6. A method of treating drilling muds of high density cotaining finely divided barite as a weighting material delivered from a well being drilled to a mud pit for reuse in drilling the well comprising withdrawing a stream of the drilling mud from the mud pit and delivering said drilling mud to a gravity separator, separating the drilling mud delivered into the gravity separator into a high density stream of drilling mud liquids containing a high concentration of barite and a low density stream containing clay and cuttings suspended in drilling mud liquids, returning the high density stream containing the high concentration of barite to the mud pit, dividing the low density stream into two streams of the same composition as the low density stream, recirculating one of the two streams into the stream of drilling mud at a point prior to the introduction of the drilling mud into the gravity separator, and discarding the other of the two streams from the system.

7. A method of treating drilling muds used in the rotary drilling of wells, comprising passing the drilling mud discharged from the well over screening apparatus to separate oversize cuttings from the drilling mud, delivering the drilling mud from the screening apparatus into a mud pit, transferring a stream of the drilling mud from the mud pit to a gravity separator, separating the drilling mud in the gravity separator into a high density stream of drilling mud liquid containing a high concentration of a weighting material and a low density stream of drilling mud liquids substantially free of weighting materials and containing clay and cuttings, returning the high density stream to the mud pit, recirculating a portion of the low density stream into the stream of drilling mud from the mud pit to the gravity separator to reduce the viscosity of the drilling mud delivered into the gravity separator, discarding a portion of the low density stream from the system, and circulating drilling mud from the mud pit down the well.

References Cited in the file of this patent

UNITED STATES PATENTS

| 1,044,844 | Argall | Nov. 19, 1912 |
| 2,276,075 | Wuensch | Mar. 10, 1942 |
| 2,870,990 | Bergey | Jan. 27, 1959 |
| 2,919,898 | Marwil | Jan. 5, 1960 |

OTHER REFERENCES

Taggart: "Elements of Ore Dressing," John Wiley and Sons, 1951, pages 162–174.